May 19, 1936. F. J. VAN LAANEN, JR 2,041,385
BRAKE ACTUATING DEVICE
Filed Feb. 28, 1935
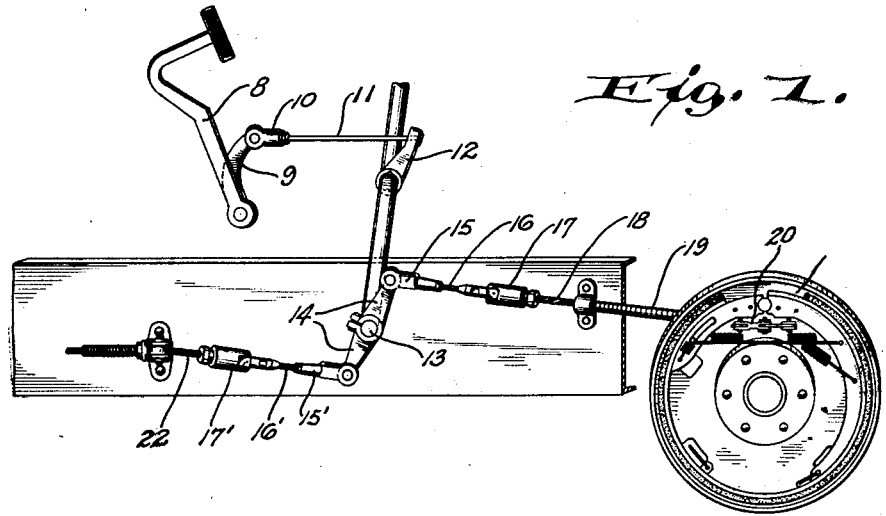
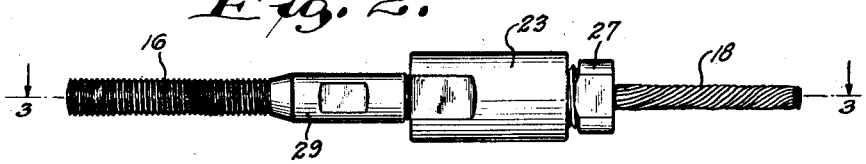
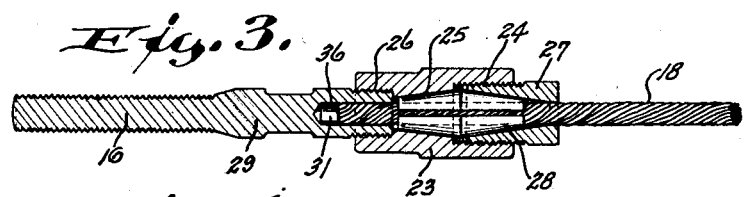
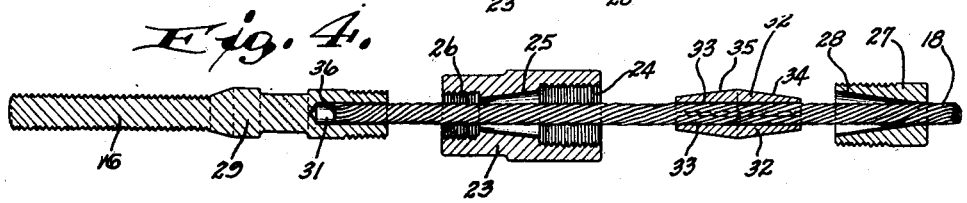
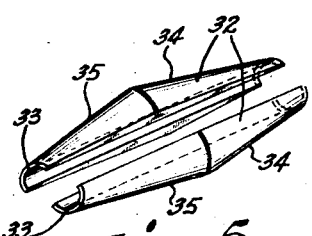
INVENTOR.
Francis J. Van Laanen Jr.
BY
Morsell Liebes & Morsell
ATTORNEYS.

Patented May 19, 1936

2,041,385

UNITED STATES PATENT OFFICE 2,041,385

BRAKE ACTUATING DEVICE

Francis J. Van Laanen, Jr., Green Bay, Wis., assignor to Green Bay Drop Forge Company, Green Bay, Wis., a corporation of Wisconsin Application February 28, 1935, Serial No. 8,616

6 Claims. (Cl. 188—196)

This invention relates to improvements in brake actuating devices.

In recent years, particularly since the advent of the four-wheel brake, actuating power has been transmitted to vehicle brakes through the medium of flexible cables. Heretofore, the fastening of said cables to clevises, rods, or equalizer bars, has been effected by means of stud or socket fittings swaged, welded, clamped, pressed, or hot metal socketed onto the end of the strand or cable in such a way that the stud or socket fittings have become permanently fixed at the point of said swaging or the like. Inasmuch as all vehicles vary in dimensions and in arrangement of parts it has been necessary to manufacture a special brake cable assembly for each particular model of each particular type of car. This necessitated either the stocking by dealers and garages of an impractical number of cable assemblies for repair or replacement purposes, or the ordering of a particular cable assembly from out of town whenever the need arose. Necessarily this latter procedure is objectionable as the customer does not care to have his car lying idle for several days awaiting the arrival of unstocked parts. In addition, the cable assemblies have been manufactured to fit new cars and when applied as a replacement part to a used car, do not permit the accomplishment of a perfect brake adjustment job as the length of the cable sections cannot be altered to compensate for wear which has occurred in other parts of the brake operating structure, and consequently many operating faults have been attributed to linings when said faults have been really due to the cable assembly structure. This impossibility of changing the length of cables is a result of the above-mentioned method of permanently swaging or otherwise permanently securing the studs or socket fittings to the ends of the cable sections.

It is therefore one of the objects of the present invention to provide an improved brake actuating device embodying cable end clamping members which can be readily applied to a desired length of cable by any repairman and which can be so attached as to permit variation in the effective length of the cable section to cause the cable to fit perfectly on any vehicle or to compensate for wear in a used car, thereby eliminating the necessity of dealers stocking special cable assemblies for each different type of car.

A more specific object of the invention is to provide a brake actuating device embodying a cable clamp structure which utilizes the gripping-collet principle, thereby achieving gripping strength which may be predetermined by computation, said collet principle being adapted to apply an equal ratio of pressure throughout its length on all portions of a cable passing through said collet.

Other objects of the invention are to provide a brake actuating device having cable end clamping members which are simple in construction, simple to attach, strong and durable, neat in appearance, and well adapted for the purposes described.

In the accompanying drawing in which the same reference numerals designate the same parts in all of the views:

Fig. 1 is a fragmentary side elevational view showing the major parts of the brake assembly, slightly in perspective, parts being shown in section;

Fig. 2 is an enlarged plan view of one of the cable end clamping devices;

Fig. 3 is a sectional view taken on line 3—3 of Fig. 2;

Fig. 4 is a view similar to Fig. 3, showing the various parts of the clamping device separated and arranged along a cable section;

Fig. 5 is an enlarged perspective view showing the two-part gripping collet alone; and Fig. 6 is a sectional view showing a modified form of construction for one of the parts of the clamping device.

Referring more particularly to the drawing, Fig. 1 illustrates the important parts in a standard cable assembly wherein the improved features are incorporated. In said figure the numeral 8 designates the usual brake pedal which is operatively connected by a curved lever 9 and clevis 10 with a rod 11. The latter rod has its other end operatively connected with an equalizer pedal control member 12 and said member is operatively associated in the usual manner with the equalizer shaft 13. On each end of the equalizer shaft is rigidly mounted an arm 14 which extends in both directions from the shaft. One end of said arm 14 is connected to a clevis 15 and said clevis has threaded therein a threaded extension stud 16 projecting from one end of the improved cable end clamping device 17. Extending from the other end of the clamping device 17 is the usual cable 18 which is usually formed of a plurality of twisted strands of wire. The cable 18 may extend through a cable sheath 19 to the back plate of the brake where it is operatively connected in the usual manner with the actuating toggle 20 of a brake 21.

The other end of the arm 14 is connected by similar parts 15', 16' and 17' with another cable 22 which extends to another one of the brakes of the vehicle. Similar connections are made with another arm 14 on the other end of the equalizer shaft 13.

Heretofore, stud or socket fittings have been permanently swaged, welded, crimped, pressed or hot metal socketed onto the ends of the cables 18 and 22 and said studs or socket fittings have been suitably connected to the clevises 15 and 15'. Due to the permanent swaging or the like, which must be done during the manufacture of the cable assembly, the garage or repairman was unable to change the length of the cable sections 18 or 22 as he had no facilities for performing swaging or making the other proper connections. It is apparent that one car will require a section of cable 18 or 22 of a substantially different length than another car. In view of impossibility of varying the length after manufacture, the garage or dealer had to either carry a special cable assembly for each particular type of car or else encounter the delays of ordering the particular assembly whenever required. Furthermore, in view of the fact that the cable assemblies were manufactured to fit new cars, when used as a replacement in a used car the cable sections 18 and 22 were frequently found to be too long in view of wear which had occurred on the clevises and other brake structure parts. Therefore a perfect brake adjustment job could not be effected.

With the present invention it is merely necessary for the dealer to stock one or at the most only a few types of cable assemblies with an adequate stock of the clamping devices 17. Inasmuch as these clamping devices are constructed so as to cooperate with the cable ends, they can be easily attached to the cables during installation by any dealer or garageman, and a perfect adjustment can be obtained in a simple manner.

While there are numerous separable cable end clamping devices, for this particular adaptation it was necessary to develop a particular type which would permit the desired adjustability of the effective length of the cable to be obtained without sacrifice of holding power. Accordingly the clamping device comprehended by the present invention has been specially designed for this particular use and is so constructed that a maximum gripping strength is obtained, which gripping strength may be predetermined by computation.

Referring to Figs. 2, 3 and 4, the numeral 23 designates a socket member having a threaded socket 24 therein communicating with a tapered bore portion 25, said tapered bore in turn communicating with another threaded socket 26 at the other end of the member 23. A threaded plug 27 cooperable with the threaded socket 24 is provided with a tapered bore 28 extending therethrough. The socket 26 is adapted to receive one end of an extension 29 which extension has the elongated threaded stud portion 16 or 16' for cooperation with the clevis 15 or 15'. The inner end of the extension member 29 has a bore 31 extending therein for a desired distance, which bore is adapted to accommodate the extreme end of the cable as will be hereinafter described. The member 29 may, if desired, be formed with a bore 31' extending entirely therethrough, as shown in Fig. 6. Said member may also be formed as an integral part of the socket 23.

In order to attain desired gripping strength it is preferred to employ a split sleeve or collet formed of two or more gripping parts 32 as illustrated in Fig. 5. Each part has a substantially semi-cylindrical recess 33 extending throughout the length thereof, said recesses being adapted to cooperate in embracing a cable extending therethrough in the manner shown in Fig. 3. The two sleeve parts 32 have reversely tapered exterior portions 34 and 35 which cooperate to produce a substantially double conical shape. The sleeve members must be formed of hardened steel and it is also preferred to form the other parts of the clamping device of similar material. The heat treatment of the steel may be varied, depending upon particular requirements, and steel of various types of analysis may be employed to meet particular conditions and to adapt the particular clamping member to a particular type of metal cable, it being important for proper results that the material of the sleeve be harder than the material of the cable.

It is important that the angle of taper of the bores 25 and 28 in the socket member 23 and plug 27 respectively coincide perfectly with the tapered exteriors 35 and 34 on the two part sleeve when the parts are in clamping position. By having perfect coincidence between these tapers on the clamping members and on the sleeve, an equal ratio of pressure on the cable throughout the length of the sleeve may be obtained as distinguished from a wedging action wherein the maximum pressure takes effect only at certain points of contact between the device and the cable.

In use, when the dealer or repairman is making an installation, it is merely necessary for him to cut off the cable sections 18 and 22 to the approximate length desired. The cable end is then threaded into the bore of the plug 27 and through the socket member 23 in the manner shown in Fig. 4. Next the two sleeve parts 32 are placed in position around the portion of the cable between the members 27 and 23 and are pushed into one or the other of said members. The extension 29 may then be threaded into the socket 26 at the other end of the socket member 23. Next the plug 27 is tightened to cause an equal ratio of pressure to be applied throughout the length of the sleeve sections 32 to cause said sleeve sections to be pressed against the portion of the cable extending therethrough in the manner shown in Fig. 3. Before finally tightening the clamp, the extreme end 36 of the cable is moved to a desired position within the bore 31 of the extension 29, to obtain a desired tautness upon the cable, this being accomplished while the threaded portion of the extension 29 is in proper connection with the clevises 15. When the exact degree of adjustment desired has been obtained on the cable 18 the plug 27 may be finally tightened to cause the sleeve members 32 or two-part collet to tightly grip the cable. It will be found that a very effective gripping strength may be obtained and this gripping strength may be predetermined during manufacture of the parts 23 and 27 by proper proportioning of the length of the sleeve parts 32, by regulation of the number of cooperating threads on the parts 27 and 23, and by varying the angle of taper 25 and 28 and the corresponding tapers 35 and 34 on the two-part collet. The holding strength may also be varied somewhat by controlling the heat treatment of the metal used in the sleeve sections 32 and in the plug 27 and socket 23 and may also be controlled by utilizing steel of various types of analysis. Certain types of cables may require clamping devices of certain specifications and larger and heavier vehicles may require greater gripping strength. It is, however, a simple matter for the dealer to stock the cable end clamping devices of various specifications to meet various requirements.

It is apparent that the dealer or garage man does not have to carry cables 18 and 22 of any definite length as these can be readily cut to the approximate length desired and a final adjustment easily effected through varying the position of the end 36 in the bore 31. A still greater range may be given by utilizing the extension members 29 having the bore 31' extending entirely therethrough.

It is apparent from the above that the improved brake actuating device greatly simplifies manufacture due to elimination of the necessity of manufacturing a separate cable assembly for each particular type of car, simplifies installation by enabling major adjustments to be accomplished during installation, increases the efficiency of the brake mechanism by making it possible to effect major adjustments at any time to take up wear or more perfectly adapt the cable assembly to a particular car, and eliminates the necessity of dealers stocking a large number of cable assemblies for cars of various specifications.

Various changes and modifications may occur to those skilled in the art and all of such changes are contemplated as may come within the scope of the claims.

What I claim is:

1. A vehicle brake assemblage comprising a brake carried by and displaceable relative to the body of the vehicle with the vehicle wheels, a flexible cable carried by the brake and displaceable therewith, manually operable means carried by the vehicle body, and a connection between said manually operable means and said cable consisting of a pair of cooperating clamping members each having a substantially conical recess therein with the wide portions of the recesses adjacent one another, one of said clamping members having a bore communicating with the recess through which the end of said flexible cable extends and the other of said members having a part provided with an elongated bore within which the cable end may be adjustably positioned, and a plural part sleeve having the same exterior shape as the combined conical recess, said clamping members being in threaded connection with one another to provide for relative movement to cause the several parts of the sleeve to uniformly grip the entire length of the cable part passing therethrough.

2. A vehicle brake assemblage comprising a brake carried by and displaceable relative to the body of the vehicle with the vehicle wheels, a flexible cable carried by the brake and displaceable therewith, manually operable means carried by the vehicle body, and a connection between said manually operable means and said cable consisting of a pair of cooperating clamping members each having a substantially conical recess therein with the wide portions of the recesses adjacent one another, one of said clamping members having a bore communicating with the recess through which the end of said flexible cable extends and the other of said members having an extension stud formed with a bore communicating with the first-mentioned bore within which second bore the cable end may be adjustably positioned, and a plural part sleeve having the same exterior shape as the combined conical recess, said clamping members being in threaded connection with one another to provide for relative movement to cause the several parts of the sleeve to uniformly grip the entire length of the cable part passing therethrough.

3. A vehicle brake assemblage comprising a brake carried by and displaceable relative to the body of the vehicle with the vehicle wheels, a flexible cable carried by the brake and displaceable therewith, manually operable means carried by the vehicle body, and a connection between said manually operable means and said cable consisting of a pair of cooperating clamping members each having a substantially conical recess therein with the wide portions of the recesses adjacent one another, one of said clamping members having a bore communicating with the recess through which the end of said flexible cable extends and the other of said members having a detachable extension stud formed with a bore communicating with the first-mentioned bore within which second bore the cable end may be adjustably positioned, and a plural part sleeve having the same exterior shape as the combined conical recess, said clamping members being in threaded connection with one another to provide for relative movement to cause the several parts of the sleeve to uniformly grip the entire length of the cable part passing therethrough.

4. A vehicle brake assemblage comprising a brake carried by and displaceable relative to the body of the vehicle with the vehicle wheels, a flexible cable carried by the brake and displaceable therewith, manually operable means carried by the vehicle body, and a connection between said manually operable means and said cable consisting of a pair of cooperating clamping members each having a substantially conical recess therein with the wide portions of the recesses adjacent one another, one of said clamping members having a bore communicating with the recess through which the end of said flexible cable extends and the other of said members having a threaded extension stud engageable with said manually operable means and formed with a bore communicating with the first-mentioned bore within which second bore the cable end may be adjustably positioned, and a plural part sleeve having the same exterior shape as the combined conical recess, said clamping members being in threaded connection with one another to provide for relative movement to cause the several parts of the sleeve to uniformly grip the entire length of the cable part passing therethrough.

5. A vehicle brake assemblage comprising a brake carried by and displaceable relative to the body of the vehicle with the vehicle wheels, a flexible cable carried by the brake and displaceable therewith, manually operable means carried by the vehicle body, and a connection between said manually operable means and said cable consisting of a pair of cooperating threaded clamping members each having a substantially conical recess therein with the wide portions of the recesses adjacent one another, one of said clamping members having a bore communicating with the recess through which the end of said flexible cable extends and the other of said members having a part provided with an elongated bore within which the cable end may be adjustably positioned, and a plural part sleeve having the same exterior shape as the combined conical recess, said clamping members being in threaded connection with one another to provide for relative movement to cause the several parts of the sleeve to uniformly grip the entire length of the cable part passing therethrough.

6. A vehicle brake assemblage comprising a brake carried by and displaceable relative to the body of the vehicle with the vehicle wheels, a flexible cable carried by the brake and displaceable therewith, manually operable means carried by the vehicle body, and a connection between said manually operable means and said cable consisting of a pair of cooperating clamping members each having a substantially conical recess therein with the wide portions of the recesses adjacent one another, one of said clamping members having a bore communicating with the recess through which the end of said flexible cable extends and the other of said members having a part provided with an elongated bore within which the cable end may be adjustably positioned, and a plural part sleeve having the same exterior shape as the combined conical recess, said clamping members being in threaded connection with one another to provide for relative movement to cause the several parts of the sleeve to uniformly grip the entire length of the cable part passing therethrough, the metal of said sleeve being of greater hardness than the metal of said cable to effect a squeezing action on the latter.

FRANCIS J. VAN LAANEN, Jr.